United States Patent
Ishii et al.

(10) Patent No.: US 6,610,000 B1
(45) Date of Patent: Aug. 26, 2003

(54) METHOD OF FOLDING AIR BAG

(75) Inventors: Tsutomu Ishii, Aichi (JP); Tadashi Yamamoto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 100 days.

(21) Appl. No.: 09/721,919

(22) Filed: Nov. 27, 2000

(30) Foreign Application Priority Data

Nov. 26, 1999 (JP) .............................. 11-336717

(51) Int. Cl.[7] .................................................. B31B 7/00
(52) U.S. Cl. .................... 493/397; 493/459; 280/728.1; 280/743.1
(58) Field of Search ................. 280/728.1, 743.1; 493/397, 405, 459

(56) References Cited

U.S. PATENT DOCUMENTS 5,785,350 A * 7/1998 Inoue et al.
6,149,568 A * 11/2000 Ross et al.
6,176,509 B1 * 1/2001 Kawaguchi et al.
6,203,062 B1 * 3/2001 Kusaka et al.
6,250,675 B1 * 6/2001 Dietsch et al.
6,336,659 B1 * 1/2002 Corrion

FOREIGN PATENT DOCUMENTS

JP          10-175494         6/1998
JP          10175494      *  6/1998

* cited by examiner

Primary Examiner—Eugene Kim
(74) Attorney, Agent, or Firm—Posz & Bethards, PLC

(57) ABSTRACT

A method of folding an air bag having a bottom wall portion with an inlet opening for introducing inflating gas, and a ceiling wall portion opposite to the inlet opening includes sewing outer circumferential edges of the bottom wall portion and the ceiling wall portion with each other so as to form the air bag. The air bag is pre-folded to make a circumferential edge of the sewed air bag close to the inlet opening after the sewing and before reversing so that creases to be formed when said air bag is received in a case are formed partly in advance. The pre-folded air bag is reversed through the inlet opening. The reversed air bag is folded so as to make the circumferential edge of the air bag close to the inlet opening.

8 Claims, 9 Drawing Sheets

CENTRAL SCHEMATIC CROSS-SECTION

SECTION ALONG XI-XI

METHOD OF FOLDING AIR BAG

BACKGROUND OF THE INVENTION

1. Field of the Invention

The present invention relates to a method of folding an air bag in an air bag system disposed in a steering wheel of a car, or in an instrument panel in front of a passenger seat, or the like.

The present application is based on Japanese Patent Application No. Hei. 11-336717, which is incorporated herein by reference.

2. Description of the Related Art

An air bag system disposed in a steering wheel is hitherto known, for example, in JP-A-10-175494. Such an air bag is sewed, folded and received in a case as follows.

That is, a bottom wall portion provided with an inlet opening for introducing inflating gas and a ceiling wall portion opposite to the inlet opening are cut out into predetermined shapes respectively. Then, the bottom wall portion and the ceiling wall portion are put on each other so that the surfaces which will be the outer circumferential surface sides of the air bag face each other. The outer circumferential edges of the bottom wall portion and the ceiling wall portion are sewed with each other. Then, the sewed air bag is reversed through the inlet opening. The reason why the air bag is reversed in such a manner is that the margin to sew up the bottom wall portion and the ceiling wall portion is prevented from being exposed on the outer circumferential surface of the air bag.

After that, in the state where the bottom wall portion and the ceiling wall portion are put on each other so as to be unfolded flatly, the circumferential edge of the air bag is folded to come close to the inlet opening.

The air bag folded thus is attached to a bag holder of a case which is constituted by the bag holder and an air bag cover (pad), while the pad is connected to the bag holder. Thus, the air bag is received in the case.

Incidentally, in the aforementioned air bag system, an inflator for supplying inflating gas to the air bag is incorporated in the air bag at the same time as the air bag is received in the case. Thus, the assembling of the air bag system is completed. Then, by use of the case (bag holder), the air bag system is attached to a steering wheel body which is coupled with a steering shaft of a vehicle. Thus, the assembling and mounting of the steering wheel on the vehicle is completed.

However, in the background art, the air bag is folded after it is reversed through the inlet opening. When the air bag is passed through the inlet opening, the circumferential edge of the air bag is folded to come close to the inlet opening because the opening area of the inlet opening is smaller than the area of the flatly unfolded bottom wall portion or the flatly unfolded ceiling wall portion. Then, when the air bag is folded after it is reversed, the circumferential edge of the air bag is folded again in the state where the bottom wall portion and the ceiling wall portion are unfolded flatly. Therefore, the work of folding the air bag before reversing it is quite useless.

SUMMARY OF THE INVENTION

It is therefore an object of the present invention to solve the foregoing problem.

It is another object of the present invention to provide a method of folding an air bag in which the work of folding the air bag after sewing up it and before receiving it in a case can be performed efficiently with no waste, so that the air bag can be received in the case with a reduced number of man-hour for the work of folding.

In order to achieve the above objects, according to an aspect of the present invention, there is provided a method of folding an air bag comprising: preparing a bottom wall portion with an inlet opening for introducing inflating gas, and a ceiling wall portion opposite to the inlet opening; sewing outer circumferential edges of the bottom wall portion and the ceiling wall portion with each other so as to form an air bag; pre-folding the sewed air bag to make a circumferential edge of the sewed air bag close to the inlet opening after the sewing and before reversing so that creases to be formed when the air bag is received in a case are formed partly in advance; reversing the pre-folded air bag through the inlet opening; further folding the reversed air bag so as to make the circumferential edge of the air bag close to the inlet opening; and putting the folded air bag into the case.

In the above method of folding an air bag, preferably, the pre-folding is carried out so that at least two creases are provided for making circumferential edges on opposite sides of the air bag close to the inlet opening respectively.

In the above method.of folding an air bag, preferably, the pre-folding is carried out by inward-roll-folding in which the circumferential edges of the air bag are rolled toward the ceiling wall portion.

In the above method of folding an air bag, preferably, when the air bag having a tether with at least two foot portions for connecting the bottom wall portion and the ceiling wall portion with each other, in the pre-folding operation, circumferential edges on opposite sides of the air bag where the two foot portions are disposed are folded to come close to the inlet opening so as to be enveloped by the two foot portions.

In the method of folding an air bag according to the present invention, before the air bag is reversed and after the outer circumferential edges of the bottom wall portion and the ceiling wall portion are sewed with each other, pre-folding is performed to make the circumferential edge of the air bag close to the inlet opening so as to form in advance a part of crease. The crease will be formed when the air bag is received in the case. Then, the air bag is reversed through the inlet opening. After being reversed, the air bag is folded after the pre-folding.

That is, folding after the air bag is reversed can be performed without any work of releasing the folding to thereby unfold the air bag flatly as in background art, because pre-folding is performed before the air bag is reversed. Thus, the folding after the air bag is reversed can be simplified. In addition, the pre-folding itself can make the air bag compact before the air bag is passed through the inlet opening. Accordingly, the background-art useless folding work before the air bag is passed through the inlet opening can be reduced to the utmost.

In addition, the air bag which has been reversed is compact because the air bag is pre-folded. Therefore, the space for the work of folding thereafter can be reduced so that a folding machine can be also miniaturized.

Accordingly, in the method of folding an air bag according to the present invention, the work of folding the air bag after sewing it up and before receiving it in the case can be performed efficiently with no waste, so that the air bag can be received in the case with a reduced number of man-hour for the work of folding. Further, the work of folding the air bag after reversing it can be performed in a saved space.

The pre-folding may be carried out so that at least two creases are provided for making the circumferential edges on opposite sides of the air bag close to the inlet opening respectively. In this case, in the air bag which has been folded up, the creases formed in the pre-folding operation are rolled in the air bag so as to intrude into the air bag. As a result, the resistance to releasing the pre-folding is increased when the air bag is unfolded and inflated, and the opposite sides of the air bag which have not been pre-folded are unfolded quickly. When the folded air bag is disposed in a boss portion of a steering wheel, the portions of the air bag which will be disposed on the left and right sides of the steering wheel are pre-folded with at least two creases respectively. Thus, the air bag is inflated easily in the front/rear direction when the air bag is unfolded and inflated. Accordingly, interference in the left and right arms of a driver can be prevented in the unfolding and inflating operation of the air bag.

Further, if the pre-folding is carried out by inward-roll-folding on the ceiling wall portion side, the resistance to releasing the inward-roll-folding is large when the air bag is unfolded and inflated. When the folded air bag is disposed in a boss portion of a steering wheel, the portions of the air bag which will be disposed on the left and right sides of the steering wheel are inward-roll-folded with at least two creases respectively. As a result, when the air bag is unfolded and inflated, it is further prevented from being unfolded in the left/right direction, but is inflated easily in the front/rear direction. Accordingly, interference in the left and right arms of a driver can be further prevented in the unfolding and inflating operation of the air bag.

Moreover, in the case where the air bag has a tether with at least two foot portions, in the pre-folding operation, the circumferential edges on opposite sides of the air bag where the two foot portions are disposed may be folded to come close to the inlet opening so as to be enveloped by the two foot portions. In this case, because the two foot portions of the tether envelop the folded portions, the creases formed in the pre-folding operation are difficult to be released. The work of reversing the air bag through the inlet opening can be carried out smoothly while the creases are prevented from being released. In addition, it becomes easy to keep the compact shape of the air bag after the work of reversing.

Features and advantages of the invention will be evident from the following detailed description of the preferred embodiments described in conjunction with the attached drawings.

DETAILED DESCRIPTION OF THE PREFERRED EMBODIMENTS

An embodiment of the present invention will be described below with reference to the drawings.

Figure 5:
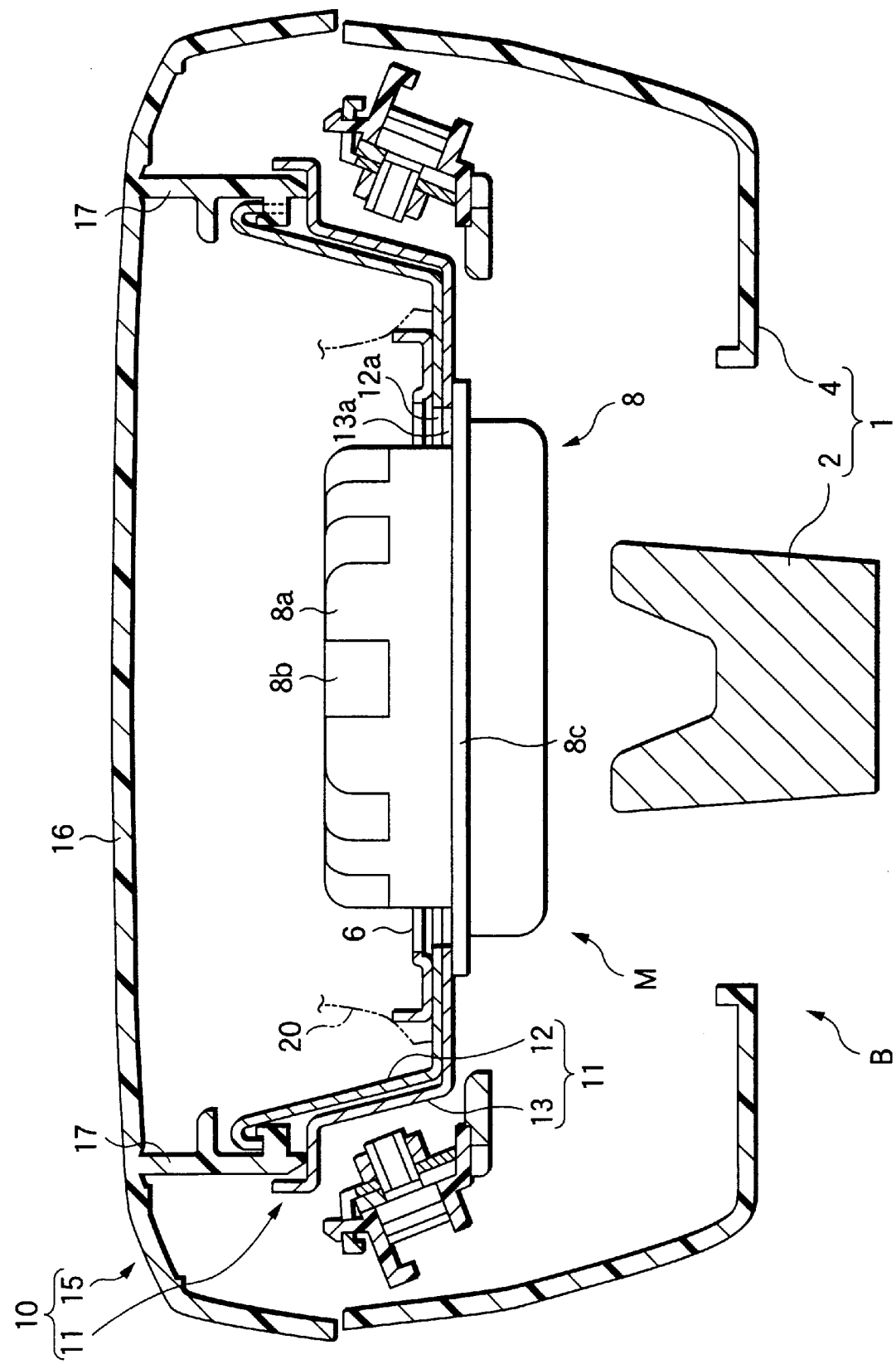
FIG. 5 is a longitudinal sectional view of a steering wheel which has received the air bag folded according to the same embodiment, corresponding to the portion taken on line V—V in FIG. 6.
Figure 6:
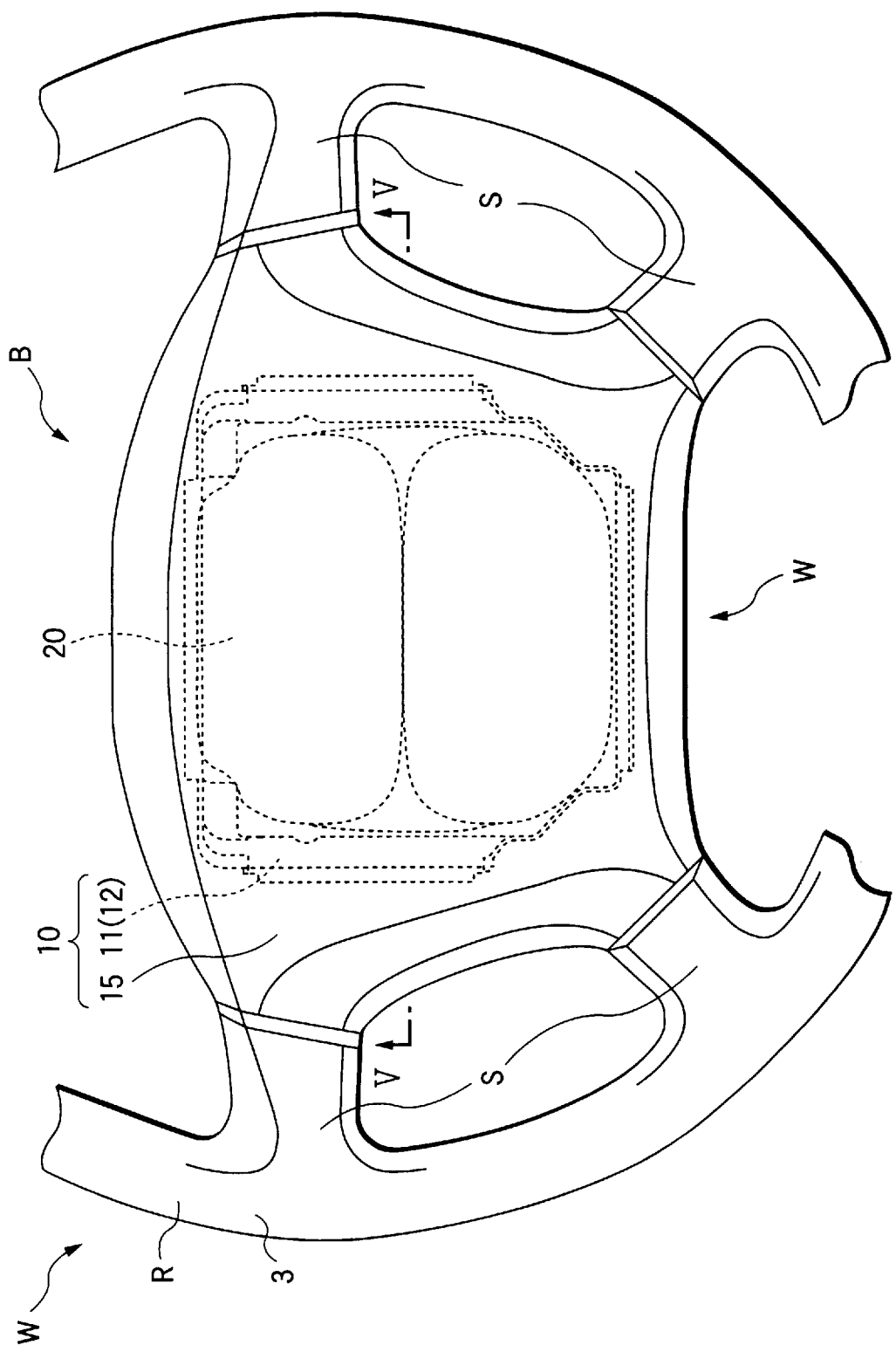
FIG. 6 is a plan view of the steering wheel which has received the air bag folded according to the same embodiment.

An air bag 20 folded according to the embodiment is used in an air bag system M for a steering wheel as shown in FIGS. 5 and 6. This air bag system M is disposed in a boss portion B at the center of a steering wheel W.

The steering wheel W is designed to have a ring portion R gripped in the steering operation, the boss portion B disposed at the center of the wheel W and connected to a not-shown steering shaft, and four spoke portions S for connecting the boss portion B with the ring portion R. In addition, the steering wheel W is also designed to have the air bag system M and a steering wheel body 1. The steering wheel body 1 is constituted by a metal core 2 made of an aluminum alloy or the like and disposed to connect the respective portions R, B and S with one another, a coating layer 3 made of synthetic resin and covering the metal core over the ring portion R and the respective spoke portions S on the ring portion R side, and a lower cover 4 made of synthetic resin and disposed in the lower portion of the boss portion B.

The air bag system M is constituted by the folded air bag 20, an inflator 8 for supplying inflating gas to the air bag 20, and a case 10 covering the folded air bag 20 so as to hold the air bag 20 and the inflator 8.

The inflator 8 is constituted by a substantially columnar body 8a having a gas outlet 8b in its upper portion for discharging inflating gas, and a substantially square plate-like flange portion 8c disposed on the outer circumferential surface of the body 8a. Through holes (not shown) to be penetrated by not-shown bolts of a retainer 6 which will be described later are formed in predetermined positions of the flange portion 8c.

The retainer 6 is made of a substantially square ring-like metal plate which has not-shown bolts projecting downward at the four corners. The retainer 6 presses the circumferential edge of a later-described inlet opening 22 of the air bag 20, and allows the not-shown bolts of the retainer 6 to project from the inflator flange portion 8c via the circumferential edge of the opening 22 and a bag holder 11 which will be described later. By screwing nuts to those bolts, the air bag 20 is attached to the later-described bag holder 11 of the case 10.

The case 10 is constituted by the bag holder 11 made of a metal plate, and a pad 15 made of synthetic resin as an air bag cover.

The bag holder 11 is constituted by a substantially rectangular parallelepiped holder plate 12 opened on the top, and a backup plate 13 for holding the pad 15 in cooperation with the holder plate 12. The respective plates 12 and 13 are provided with insertion holes 12a and 13a into which the body 8a of the inflator 8 is inserted from below, and attachment holes (not shown) which are disposed around the insertion holes 12a and 13a and into which the not-shown bolts of the retainer 6 are inserted, respectively. In addition, the backup plate 13 is provided with a not-shown bracket which is connected to the metal core 2 of the steering wheel body 1.

The pad 15 is constituted by a cover portion 16 covering the upper portion of the boss portion B, and a substantially square-cylindrical side wall portion 17 projecting downward from the lower surface of the circumferential edge of the cover portion 16. The cover portion 16 has two door portions (having no reference numeral in the drawings) in the portion surrounded by the side wall portion 17. The door portions can open in the front/rear direction of the steering wheel W when the air bag 20 is inflated. A thin rupture presumptive portion (having no reference numeral in the drawings) which will be pushed by the air bag 20 so as to be ruptured to allow the door portions to open smoothly is formed around the door portions. The vicinity of the lower end of the side wall portion 17 is held between the holder plate 12 and the backup plate 13 which constitute the bag holder 11. Thus, the side wall portion 17 is retained in the bag holder 11.

Incidentally, in this embodiment, the lower surface of the folded air bag 20 is regulated by the holder plate 12 of the bag holder 11 and the body 8a of the inflator 8 while the upper surface is regulated by the cover portion 16 and the side wall portion 17 of the pad 15.

Figure 1:
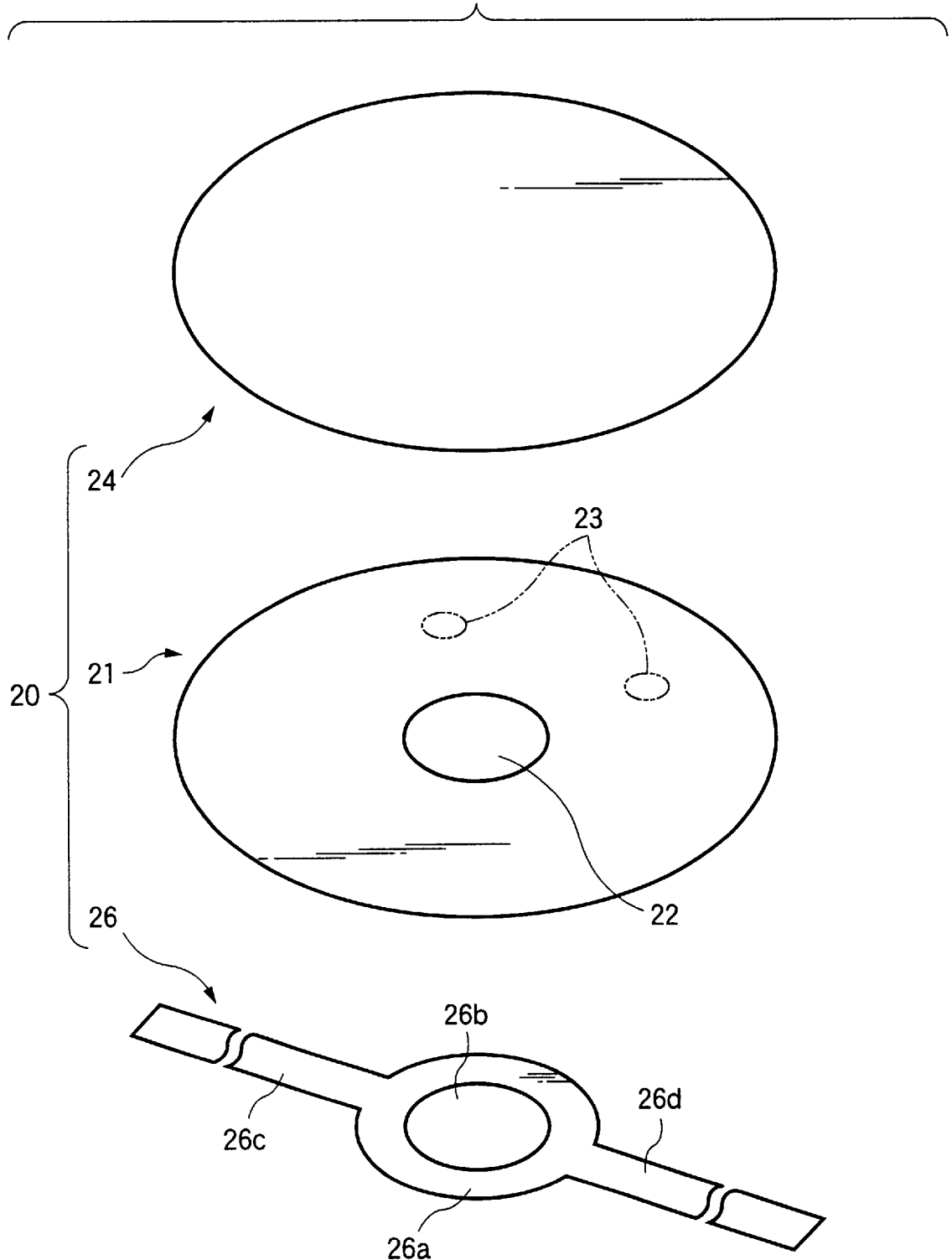
FIG. 1 is an exploded perspective view of an air bag for use in an embodiment of the present invention.
Figure 2:
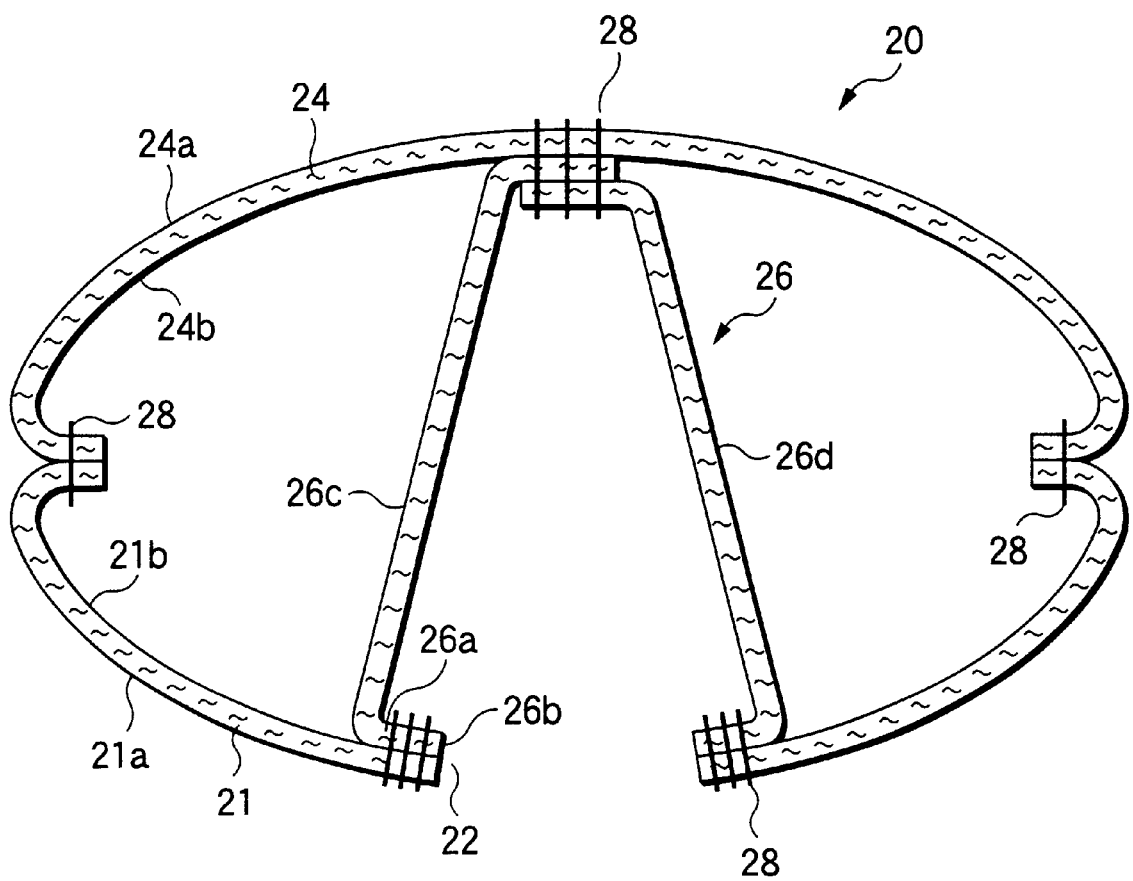
FIG. 2 is a schematic longitudinal sectional view of the air bag in the same embodiment when the air bag is unfolded and inflated.

As shown in FIGS. 1 and 2, the air bag 20 is shaped into a bag with the inlet opening 22 for introducing the inflating gas, and designed to have a substantially elliptically spherical shape in section when it is inflated. In this embodiment, the air bag 20 is a planar air bag which is formed by laying two sheets of given fabric material on each other and sewing the circumferential edges of the sheets of fabric material with each other. That is, fabric of polyamide yarns, polyester yarns, or the like, is cut out into circular shapes, and subjected to a predetermined work of perforating so as to prepare a bottom wall portion 21 and a ceiling wall portion 24. The circumferential edges of the two sheets of fabric material are sewed with each other so as to form an air bag. The air bag 20 in this embodiment is further provided with a tether 26 for regulating a separation distance between the bottom wall portion 21 and the ceiling wall portion 24 when the air bag 20 is inflated.

The inlet opening 22 for introducing the inflating gas is formed at the center of the bottom wall portion 21 so as to open in a circular shape. Four attachment holes (not shown) into which the not-shown bolts of the retainer 6 will be inserted are formed at the circumferential edge of the opening 22. The inner diameter of the opening 22 is made approximately equal to those of the retainer 6 and the insertion holes 12a and 13a of the bag holder 11, so that the body 8a of the inflator 8 can be inserted thereinto from below. Incidentally, in the bottom wall portion 21, vent holes 23 and 23 (see the two-dot chain line in FIG. 1) are formed so as to allow the introduced inflating gas to escape therefrom. The positions where the vent holes 23 and 23 are disposed are set so that, when the air bag 20 is unfolded and inflated after the air bag system M is attached to a vehicle, the vent holes 23 and 23 will be disposed in front of the steering wheel W.

The tether 26 is formed by cutting fabric of polyamide yarns, polyester yarns, or the like, in the same manner as the bottom wall portion 21 and the ceiling wall portion 24. In this embodiment, the tether 26 is provided with a center portion 26a with an opening 26b the inner diameter of which is equal to that of the inlet opening 22, and two foot portions 26c and 26d extending from the opposite sides of the center portion 26a. The circumferential edge of the opening 26b of the center portion 26a is sewed with the circumferential edge of the opening 22 of the bottom wall portion 21, and the end portions of the foot portions 26c and 26d are sewed with the ceiling wall portion 24. Then, the positions where the foot portions 26c and 26d are disposed in the air bag 20 are on the opposite sides of the circumferential edge of the inlet opening 22. In this embodiment, the positions of the foot portions 26c and 26d are set so that, when the air bag 20 is unfolded and inflated after the air bag system M is attached to the vehicle, the foot portions 26c and 26d will be disposed on the left and right sides of the steering wheel W.

Description will be made about the work in which the air bag 20 is manufactured, folded and received in the case 10. First, fabric is cut out into predetermined shapes while predetermined holes 22, 23 and 26a, and so on, are formed therein. Thus, the bottom wall portion 21, the ceiling wall portion 24 and the tether 26 are prepared. Next, by use of a sewing yarn 28, the circumferential edge of an opening 26b of the tether center portion 26a is sewed with a surface 21b at the circumferential edge of the opening 22 of the bottom wall portion 21. The surface 21b of the bottom wall portion 21 will be the back side of the air bag 20. Then, the respective surfaces 21a and 24a of the bottom wall portion 21 and the ceiling wall portion 24 which will be the surface side of the air bag 20 are put on each other, and the outer circumferential edges of the bottom wall portion 21 and the ceiling wall portion 24 are sewed with each other by use of the sewing yarn 28. Further, the end portions of the foot portions 26c and 26d of the tether 26 are sewed by the sewing yarn 28 at the vicinity of the center of a surface 24b of the ceiling wall portion 24. The surface 24b of the ceiling wall portion 24 will be the back side of the air bag 20. Thus, the air bag 20 can be manufactured.

Figure 3A:
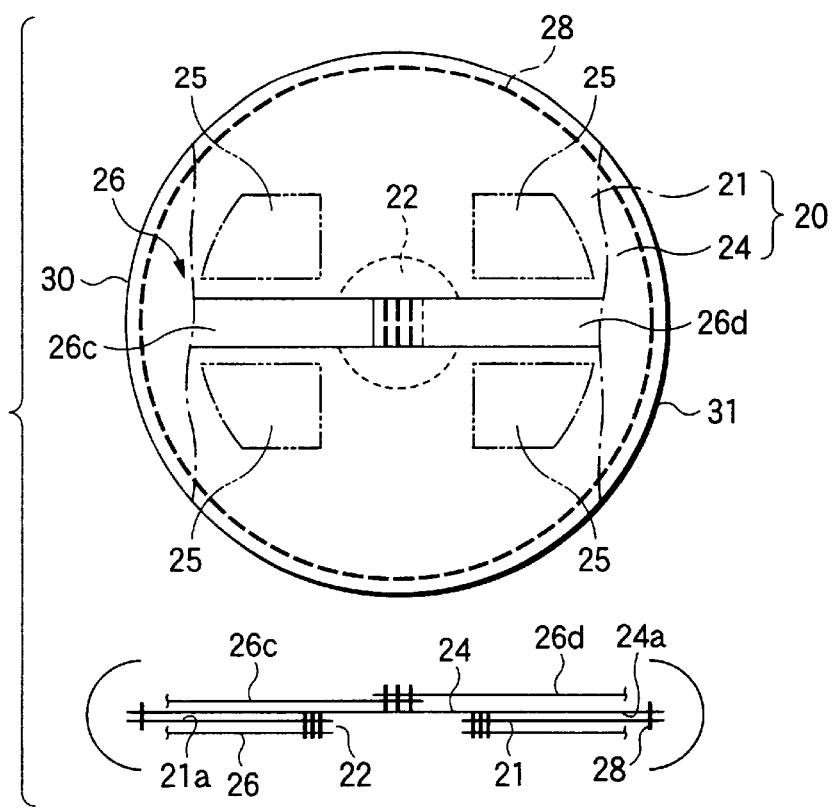
FIGS. 3A and 3B are view for explaining pre-folding in folding of the air bag in the same embodiment.
Figure 3B:
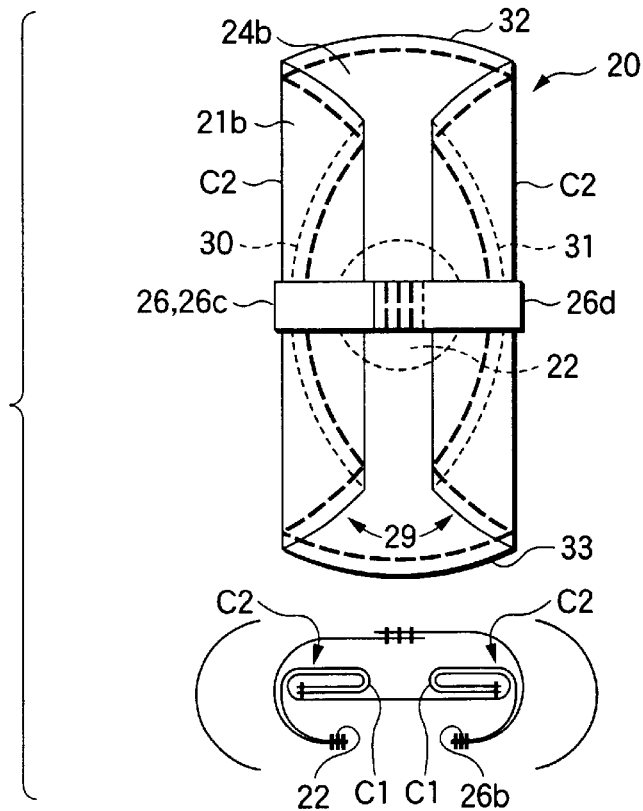

Then, pre-folding is performed to make the circumferential edge of the air bag 20 close to the inlet opening 22. In this embodiment, the pre-folding is carried out by inward-roll-folding in which creases C1 and C2 are made while edges 30 and 31 in the left/right direction are folded inside the creases C1 and C2 on the surface 24b of the ceiling wall portion 24 which will be the back side of the air bag 20, as shown in FIGS. 3A and 3B. Although the bottom wall portion 21 and the ceiling wall portion 24 of the air bag 20 are unfolded flatly like a circle in FIG. 3A, the left and right edges 30 and 31 of the air bag 20 are practically incurved with respect to their illustrated positions shown in FIG. 3A (one-dot chain line in the plan view of FIG. 3A). This is because the lengths of the foot portions 26c and 26d of the tether 26 are made shorter than the diameter of the flatly unfolded bottom wall portion 21 or the flatly unfolded ceiling wall portion 24 as shown in FIG. 3B. When the left and right edges 30 and 31 are inward-roll-folded, the air bag 20 is pre-folded with a folding width which allows the foot portions 26c and 26d of the tether 26 to envelop the opposite left and right edges of the pre-folded air bag 20 in the state where the foot portions 26c and 26d are extended.

Figure 4A:
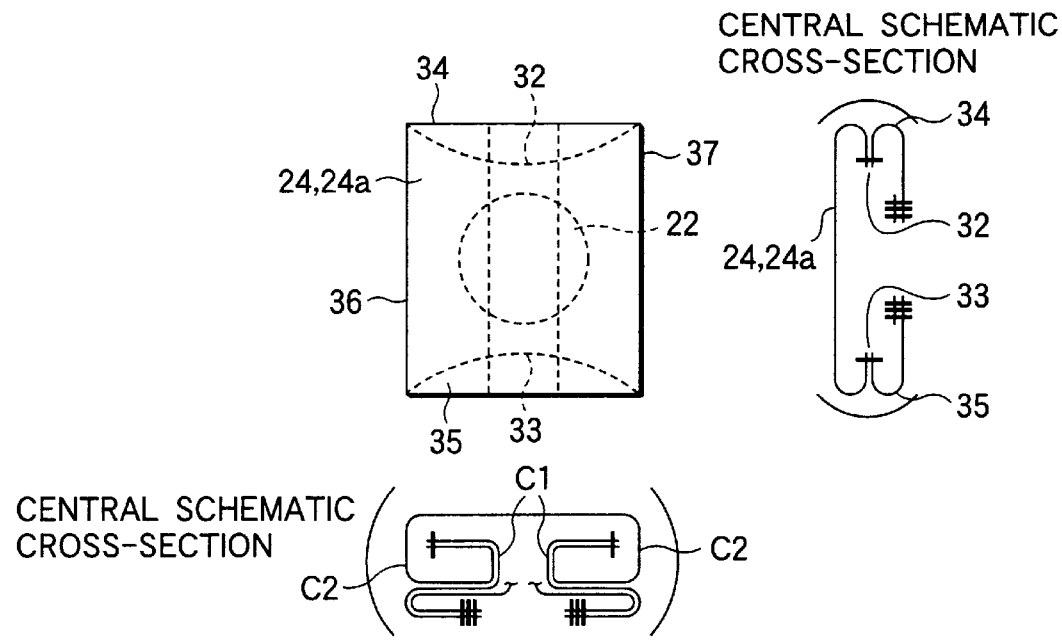
FIGS. 4A to 4C are views for explaining the folding after reversing in the folding of the air bag in the same embodiment.

After that, in the state where the air bag 20 has been pre-folded, the air bag 20 is reversed through the inlet opening 22 and the opening 26b as shown in FIGS. 3B and 3C and FIG. 4A. At this time, the air bag 20 is not reversed perfectly. That is, front and rear edges 32 and 33 of the air bag 20 are left in the state where they have been received inside as shown in the longitudinal sectional view of FIG. 4A. Then, front and rear edges 34 and 35 which appear on the external surface of the air bag 20 in the vicinity of the edges 32 and 33 are kept like straight lines extending in the left/right direction. The front and rear edges 34 and 35 together with left and right edges 36 and 37 make the air bag 20 have a rectangular shape in plan view of the air bag 20 so as to make the air bag 20 easy to fold after reversing.

Figure 4B:
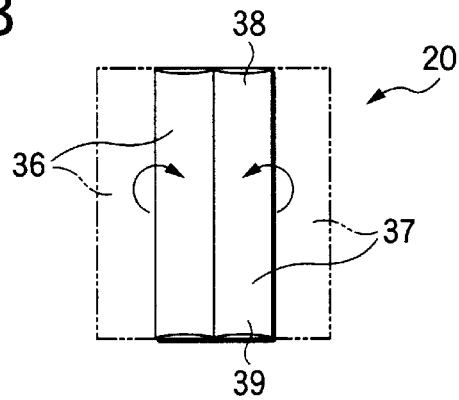

Next, as shown in FIG. 4B, the left and right edges 36 and 37 of the air bag 20 are folded to come close to the opening 22 the surface 24a of the ceiling wall portion 24 which will be on the surface side of the air bag 20. Before the left and right edges 36 and 37 are folded back, the retainer 6 is put into the air bag 20 so that the not-shown bolts of the retainer 6 are made to project from the not-shown attachment holes at the circumferential edge of the opening 22 of the air bag 20.

Figure 4C:
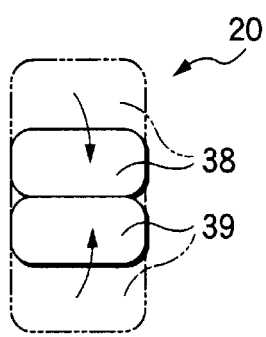

After the left and right edges 36 and 37 have been folded up, front and rear edges 38 and 39 of the air bag 20 are folded to come close to the opening 22 as shown in FIG. 4C. Thus, the work of folding the air bag 20 is completed.

Incidentally, after the work of folding the air bag 20 has been completed, the air bag 20 may be wrapped in a thin wrapping bag which can be ruptured, in order to prevent the air bag 20 from being unfolded to thereby restore its original state.

Next, description will be made about receiving the folded air bag 20 in the case 10. First, the respective not-shown bolts of the retainer 6 projecting from the inside of the folded air bag 20 are made to penetrate the holder plate 12 of the bag holder 11 so that the air bag 20 is mounted on the holder plate 12.

Then, the pad 15 is put on the air bag 20 from above, and locked on the holder plate 12. Further, the backup plate 13 is disposed under the holder plate 12 so that the side wall portion 17 of the pad 15 is held between the holder plate 12 and the backup plate 13. Thus, the pad 15 is retained by the bag holder 11. At this time, the not-shown bolts of the retainer 6 are left in the state where they have penetrated the backup plate 13 at predetermined portions.

Then, the body 8a of the inflator 8 is inserted into the insertion holes 12a and 13a of the bag holder 11 and the openings 22 and 26b from below, while the not-shown bolts of the retainer 6 are made to project downward from the flange portion 8c of the inflator 8. When nuts are screwed to the bolts, the air bag 20, the bag holder 11 and the inflator 8 can be assembled integrally. When the assembling of the air bag system M is thus completed, the folded air bag 20 can be received in the case 10.

Description will be described about mounting of the air bag system M on a vehicle. In the state where the metal core 2 of the boss portion B of the steering wheel body 1 is fastened to a not-shown steering shaft of the vehicle, the air bag system M is connected to a predetermined portion of the metal core 2 of the steering wheel body 1 by use of a not-shown bracket of the backup plate 13 of the bag holder 11. Thus, the air bag system M can be incorporated in the steering wheel W and hence mounted on the vehicle.

When inflating gas is discharged from the gas outlet 8b of the inflator 8 after the air bag system M has been mounted on the vehicle, the inflating gas is introduced into the air bag 20 through the opening 22 and the air bag 20 ruptures a not-shown rupture presumptive portion of the pad cover portion 16 so as to open predetermined door portions of the cover portion 16. Thus, the air bag 20 projects from the pad 15 so as to be unfolded and inflated on a large scale.

In the method of folding the air bag 20 according to this embodiment, pre-folding operation in which the circumferential edges 30 and 31 are made to come close to the inlet opening 22 is performed so that parts C1 and C2 of creases, which creases will be formed when the air bag 20 is received in the case 10, are formed in advance before the air bag 20 is reversed after the outer circumferential edges of the bottom wall portion 21 and the ceiling wall portion 24 are sewed with each other. After the pre-folding operation, the air bag 20 is reversed through the inlet opening 22, and then folded up in the folding after the air bag 20 has been pre-folded and reversed.

That is, because the air bag 20 is pre-folded before being reversed, the air bag 20 can be folded, in the folding after reversing, without carrying out the work in which creases of the air bag 20 are canceled to unfold the air bag 20 flatly. Thus, the folding after reversing can be simplified. In addition, the pre-folding itself can make the air bag 20 compact before the air bag 20 is passed through the inlet opening 22. Accordingly, the useless work of folding which is carried out in the background art before the air bag 20 is passed through the inlet opening 22 can be reduced to the utmost.

In addition, because the air bag 20 which has been reversed is made compact by the pre-folding, the space required for the work of folding thereafter can be reduced. As a result, a folding machine used for the work of folding the air bag 20 after reversing it can be miniaturized.

Therefore, in the method of folding the air bag 20 according to this embodiment, the work of folding the air bag 20 after sewing it and before receiving it in the case 10 can be carried out efficiently with no waste, and the air bag 20 can be received in the case 10 with a reduced number of man-hour for the work of folding. Further, the work of folding the air bag 20 after reversing it can be carried out in a saved space.

In this embodiment, pre-folding is performed with the two creases C1 and C2 provided to allow the opposite circumferential edges 30 and 31, which will be on the left and right sides when the air bag 20 is received in the case 10, to come close to the inlet opening 22. Accordingly, when the air bag 20 has been folded up, the creases C1 and C2 formed in the pre-folding operation are rolled in the air bag 20 so as to intrude into the air bag 20 as a result of reversing the air bag 20. Thus, the resistance to releasing the creases is increased when the air bag 20 is unfolded and inflated. As a result, when the air bag 20 is unfolded and inflated, the air bag 20 is easy to be unfolded and inflated in the front/rear direction rather than in the left/right direction, so that interference in the left and right arms of a driver can be prevented in the unfolding and inflating operation of the air bag 20.

Figure 8:
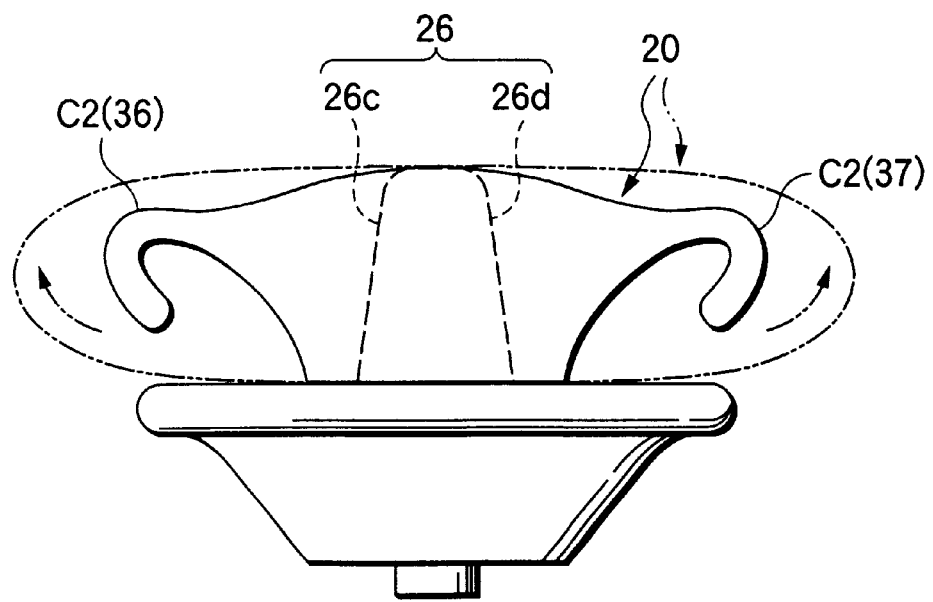
FIG. 8 is a view showing the unfolding and inflating of the air bag folded according to the same embodiment, in the left/right direction of the steering wheel.

Particularly, in this embodiment, the pre-folding is carried out by inward-roll-folding in which the air bag 20 is folded on the surface 24b which is the back side of the ceiling wall portion 24. Therefore, as shown in FIG. 8, the air bag 20 is prevented from being unfolded in the left/right direction, when the air bag 20 is unfolded and inflated. Accordingly, the air bag 20 is easier to be inflated in the front/rear direction so that interference in the left and right arms of the driver can be further prevented in the inflating operation of the air bag 20.

Figure 7:
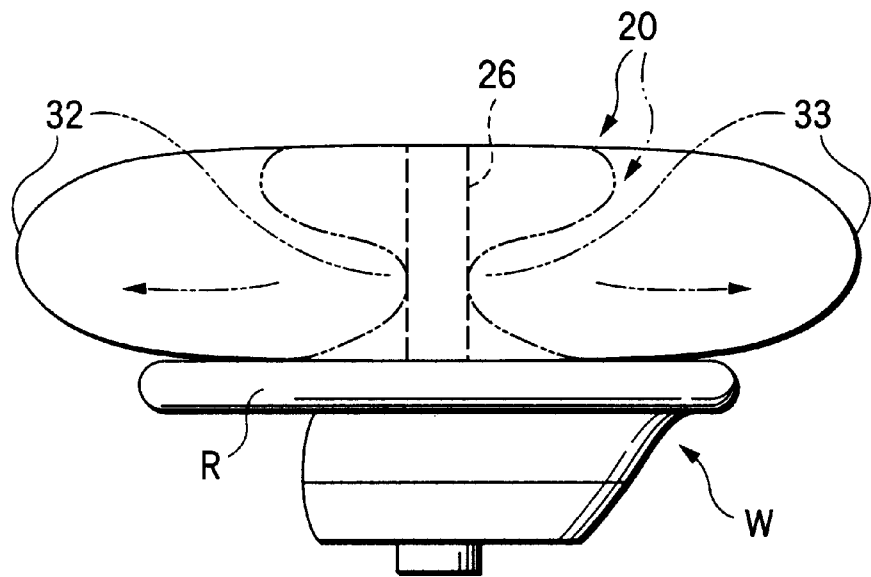
FIG. 7 is a view showing the unfolding and inflating of the air bag folded according to the same embodiment, in the front/rear direction of the steering wheel.

In this embodiment, when the air bag 20 is pre-folded and reversed, the front and rear edges 32 and 33 of the air bag 20 are folded in the front/rear direction of the steering wheel W only to sink inward, as shown in the longitudinal sectional view of FIG. 4A. Therefore, when the air bag 20 is unfolded and inflated, the front and rear edges 32 and 33 project quickly in the front/rear direction, as shown in FIG. 7. As a result, the capacity of the inflating gas flowing in the left/right direction becomes so small that the air bag 20 is prevented from being unfolded and inflated in the left/right direction. Accordingly, interference in the left and right arms of the driver can be further prevented in the unfolding and inflating operation of the air bag 20.

In addition, in this embodiment, when the pre-folding is carried out to fold the left and light edges 30 and 31 of the air bag 20, the two foot portions 26c and 26d of the tether 26 envelop folded portions 29 and 29 (see FIG. 3B) of the air bag 20 in the left/right direction of the air bag 20. As a result, the creases C1 and C2 formed in the pre-folding operation are difficult to be released, so that the work of reversing the air bag 20 through the opening 22 can be carried out smoothly while the creases C1 and C2 are prevented from being released. In addition, the compact shape of the air bag 20 can be kept easily also after the air bag 20 is reversed.

Figure 9:
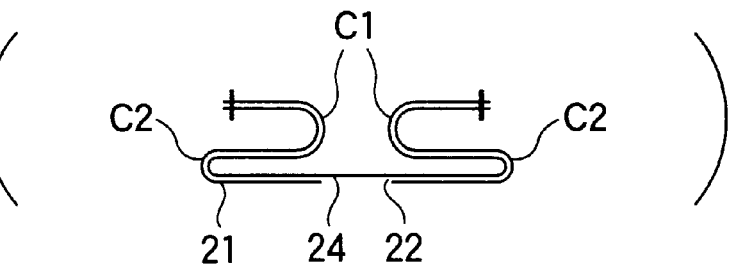
FIG. 9 is a view for explaining another example of pre-folding in the folding of the air bag in the same embodiment.
Figure 9:
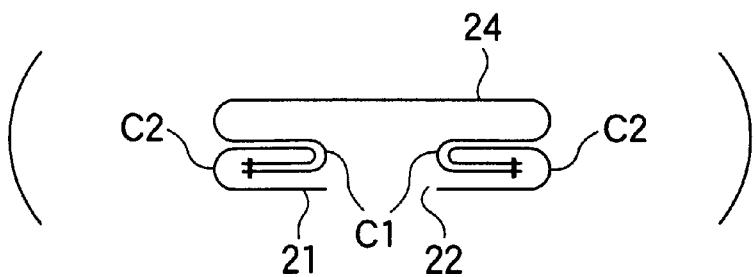

Further, creases at the opposite circumferential edges in the pre-folding operation may be formed not by inward-roll-folding as described in this embodiment but by bellows-folding in which the left and right edges 30 and 31 are folded on each other on the surface 24b which is the back side of the ceiling wall portion 24, as shown in FIG. 9. Also in this case, if at least two creases C1 and C2 are formed in the pre-folding, the creases C1 and C2 are rolled in the air bag 20 so as to intrude into the air bag 20 after the air bag 20 is reversed. Accordingly, the air bag 20 is prevented from being unfolded in the left/right direction when the air bag 20 is unfolded and inflated. As a result, it is preferable that at least creases at the opposite circumferential edges in the pre-folding operation are formed by inward-roll-folding, bellows-folding, or outward-roll-folding (a folding manner in which the opposite edges 30 and 31 are rolled on the bottom wall portion 21 side). Incidentally, in the case of roll-folding, it is considered that the air bag 20 is rolled from its edge successively so as to be folded up spirally in the form of a substantially columnar shape in section. In that case, no clear creases are provided in the air bag 20. Even in the case, however, if the air bag 20 is received in the case 10 after being reversed and folded through a predetermined folding, the air bag 20 is compressed in the axial direction of the inlet opening 22. Therefore, a plurality of creases along the opening plane of the opening 22 are formed in the portions of the air bag 20 which have been roll-folded before the air bag 20 is reversed. Thus, those pre-folded portions can be prevented from being unfolded and inflated when the air bag 20 is unfolded and inflated. Therefore, even by roll-folding which cannot provide any clear crease before the air bag 20 is reversed, it will go well of at least two creases due to the pre-folding operation before reversing are formed when the air bag 20 is received in the case 10.

A temporarily fixing material 25 made of adhesive material may be applied to the portions designated by the two-dot chain line in FIG. 3A so as to fix the folded portions 29 (see FIG. 3B) temporarily in the pre-folding. Alternatively, the folded portions 29 after the pre-folding may be temporarily fixed to the vicinity of the circumferential edge of the opening 22 by a temporarily fixing material made of a sewing yarn which can be ruptured. With such a configuration, when the air bag 20 is unfolded and inflated, the folded portions 29 are further prevented from being released from folding, so that interference in the left and right arms of the driver can be prevented in the unfolding and inflating operation of the air bag 20.

Figure 10:
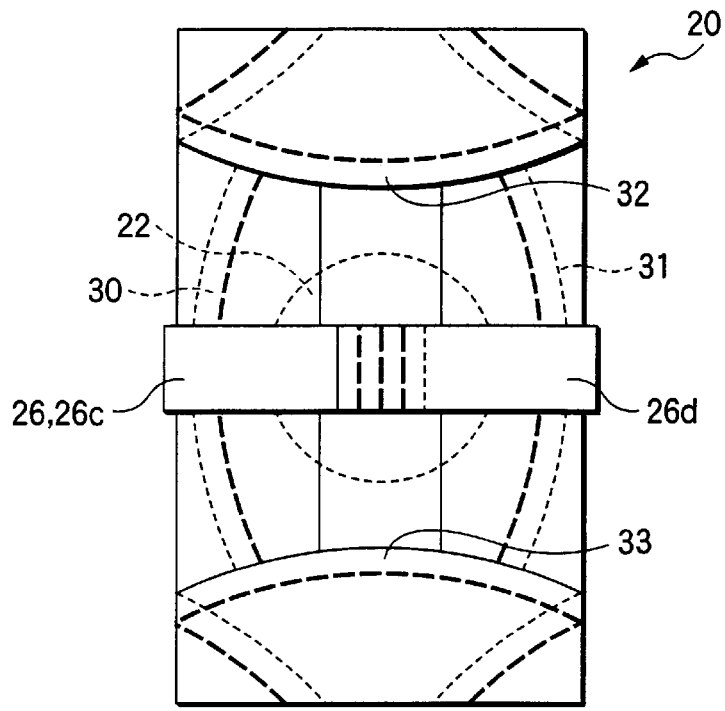
FIG. 10 is a view for explaining another example of the folding before reversing in the folding of the air bag in the same embodiment.
Figure 11:
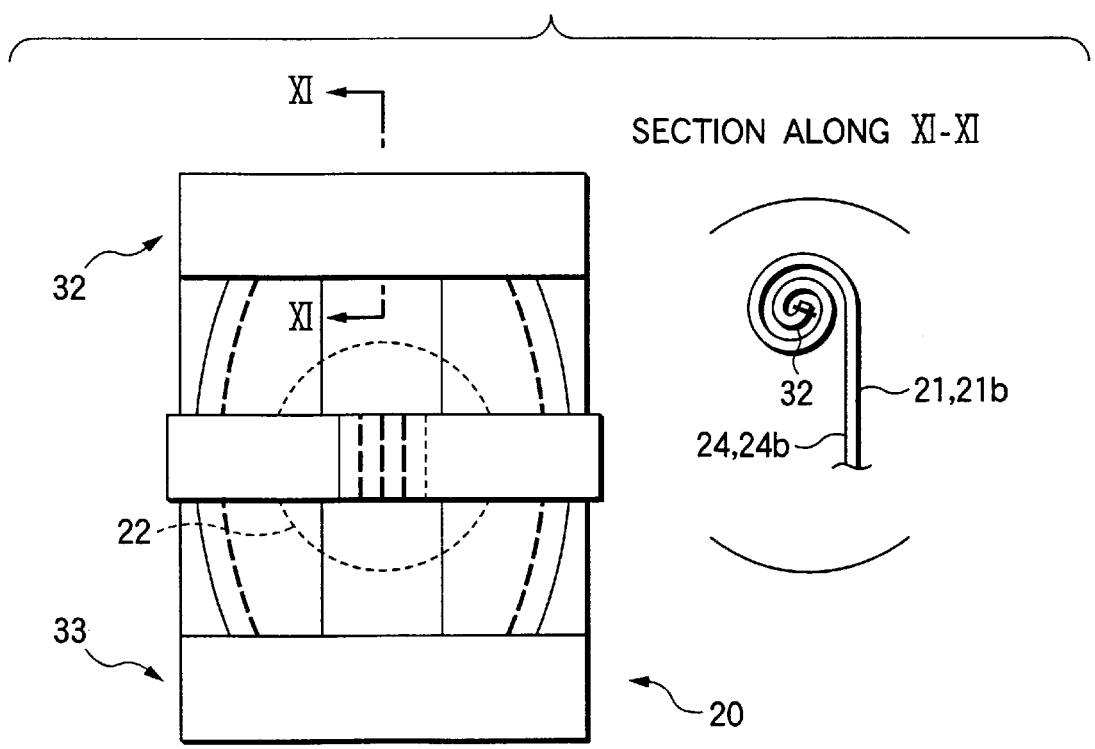
FIG. 11 is a view for explaining a further example of the folding step before reversing in the folding of the air bag in the same embodiment.

Moreover, as shown in FIG. 10, the front and rear edges 32 and 33 of the air bag 20 may be folded back in the form of bellows on the surface 24b which is the back side of the ceiling wall portion 24, before the air bag 20 is reversed. Alternatively, as shown in FIG. 11, the edges 32 and 33 may be inward-roll-folded on the surface 24b which is the back side of the ceiling wall portion 24.

Although this embodiment showed the case where the edges 36 to 39 were folded into bellows back to the inlet opening 22 on the surface 24a which is the surface side of the ceiling wall portion 24 when the air bag 20 was folded after it was reversed, as shown in FIGS. 4B and 4C, the air bag 20 may be folded in the following manner after it is reversed. That is, the front and rear edges 38 and 39 may be first folded, or the edges 36 to 39 may be inward-roll-folded or outward-roll-folded (a folding manner in which they are rolled on the bottom wall portion 21 side).

Further, although this embodiment showed the case where the foot portions 26c and 26d of the tether 26 were disposed in the left/right direction when the air bag 20 was mounted on a vehicle, the positions where the foot portions 26c and 26d of the tether 26 are disposed are not limited to such a direction. That is, from the view point of preventing the creases C1 and C2 from being released when the air bag 20 is reversed, if the direction of the opposite circumferential edges of the air bag 20 to be pre-folded can be made to coincide with each other and if the folded portions 29 and 29 in the pre-folding operation can be enveloped by the foot portions 26c and 26d, the foot portions 26c and 26d are not necessary to be disposed in the right/left direction when the air bag 20 is mounted on a vehicle. In addition, the number of the foot portions 26c and 26d of the tether 26 may be increased to three or more. In such a case, the portions folded in the pre-folding operation are enveloped by two of these foot portions. Alternatively, foot portions 26c and 26d of the tether 26 which total up to four may be provided to face each other in perpendicular directions. In such a case, the portion folded in the pre-folding operation is enveloped from their front, rear, left and right sides by the four foot portions 26c and 26d.

Moreover, although description was made in this embodiment about the air bag 20 of the air bag system M for use in the steering wheel W, the present invention is applicable to a passenger seat air bag system in front of a passenger seat, a side air bag system disposed on a side of a seat, or the like, if the air bag can be received in the case after the bottom wall portion with an inlet opening for introducing inflating gas, and the ceiling wall portion opposite to the inlet opening are put on each other and folded, and if the flatly unfolded outer circumferential edge of the air bag is folded to come close to the inlet opening.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A method of folding an air bag, comprising:
preparing a bottom wall portion with an inlet opening for introducing inflating gas, and a ceiling wall portion opposite to said inlet opening;
sewing outer circumferential edges of said bottom wall portion and said ceiling wall portion with each other so as to form an air bag;
pre-folding said sewed air bag to make a circumferential edge of said sewed air bag close to said inlet opening after the sewing to thereby partly form creases which are secured when said air bag is received in a case;

reversing said pre-folded air bag through said inlet opening; and folding said reversed air bag so as to make said circumferential edge of said air bag close to said inlet opening.

2. A method of folding an air bag according to claim 1, wherein said pre-folding is carried out so that at least two creases are provided for making circumferential edges on opposite sides of said air bag close to said inlet opening respectively.

3. A method of folding an air bag according to claim 2, wherein said pre-folding is carried out by inward-roll-folding in which said circumferential edges of said air bag are rolled toward said ceiling wall portion.

4. A method of folding an air bag according to claim 2, wherein said pre-folding is carried out by bellows-folding in which said circumferential edges of said air bag are folded on said ceiling wall portion.

5. A method of folding an air bag according to claim 1, further comprising:

attaching a tether having at least two foot portions for connecting said bottom wall portion and said ceiling wall portion with each other; and enveloping circumferential edges on opposite sides where said two foot portions are disposed by said two foot portions in the pre-folding to make the circumferential edges on the opposite sides close to said inlet opening.

6. A method of folding an air bag according to claim 1, wherein, in reversing the pre-folded air bag through the inlet opening, front and rear edges in the circumferential edge of the air bag are left inside of the air bag.

7. A method of folding an air bag according to claim 6, further comprising forming straight lines extending in a left and right direction at front and rear sides of the air bag by the front and rear edges left inside of the air bag to make the folded air bag have a rectangular shape in a plan view.

8. A method of folding an air bag, comprising:

preparing a bottom wall portion with an inlet opening for introducing inflating gas, and a ceiling wall portion opposite to said inlet opeing;

sewing outer circumferential edges of said bottom wall portion and said ceiling wall portion with each other so as to form an air bag;

pre-folding said sewed air bag to make a circumferential edge of said sewed air bag close to said inlet opening after the sewing to thereby partly form creases which are secured when said air bag is received in a case;

reversing said pre-folded air bag through said inlet opening; and folding said reversed air bag so as to make said circumferential edge of said air bag close to said inlet opening, wherein an outer shape of the air bag is not changed by the reversing of the pre-folded air bag through the inlet opening.

* * * * *